Feb. 6, 1973   H. J. OTTAWAY   3,715,000
ENGINE POWERED JUMPING STICK
Filed May 21, 1971   4 Sheets-Sheet 1

INVENTOR.
HERBERT J. OTTAWAY
BY
Robert E Breidenthal
ATTORNEY

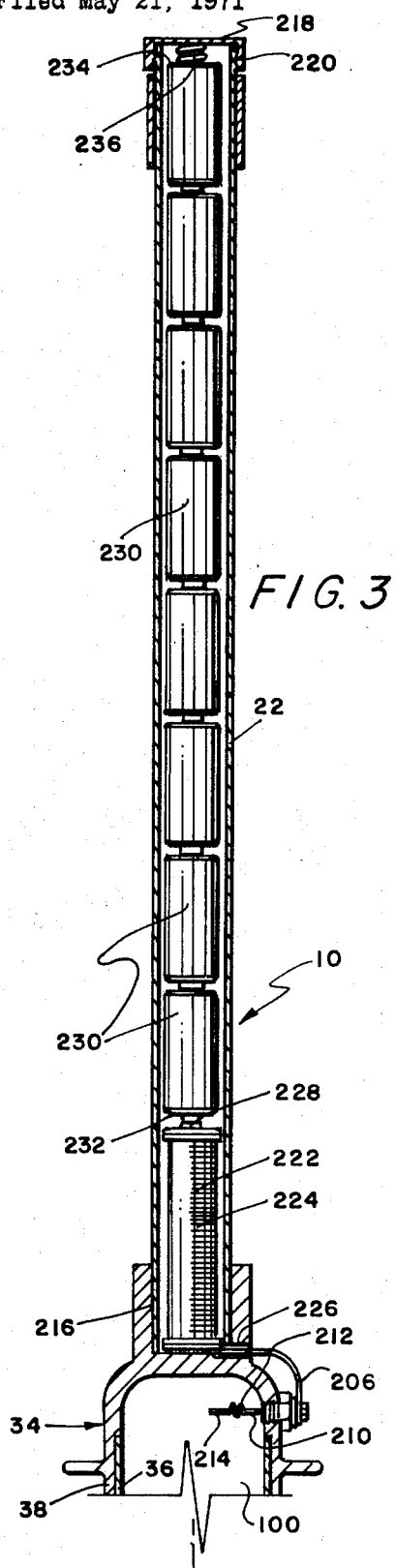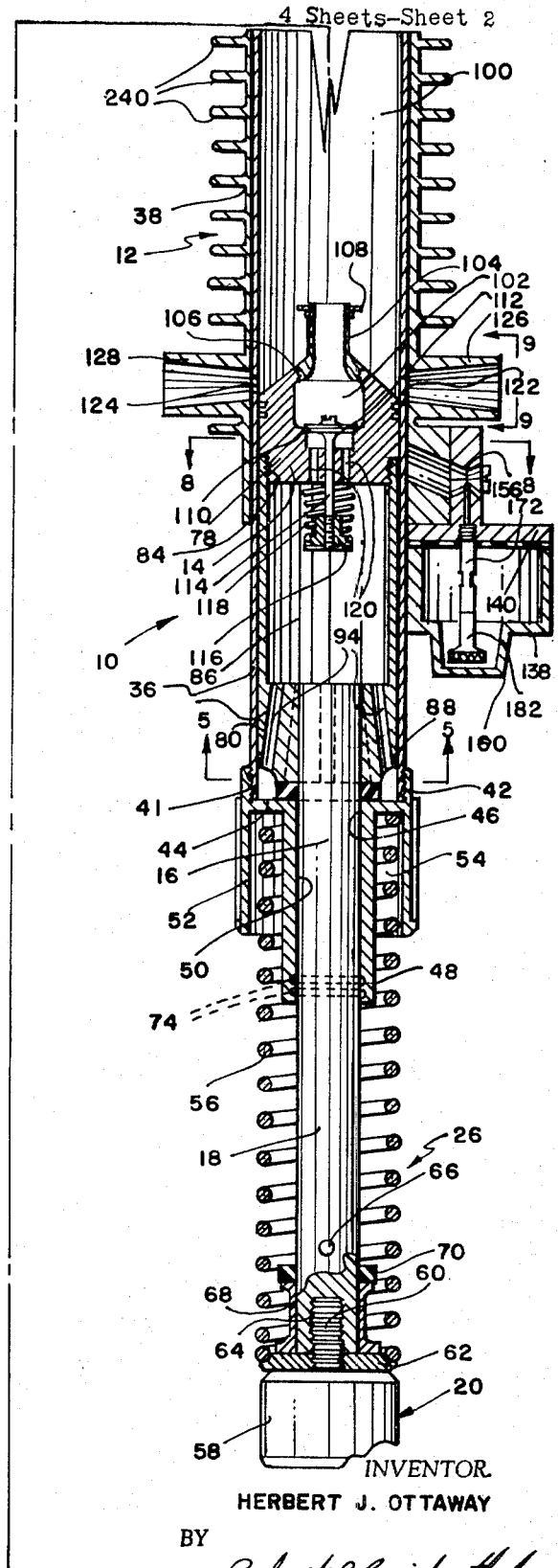

Feb. 6, 1973   H. J. OTTAWAY   3,715,000
ENGINE POWERED JUMPING STICK
Filed May 21, 1971   4 Sheets-Sheet 3

INVENTOR.
HERBERT J. OTTAWAY
BY *Robert E Breidenthal*
ATTORNEY

Feb. 6, 1973  H. J. OTTAWAY  3,715,000
ENGINE POWERED JUMPING STICK
Filed May 21, 1971  4 Sheets-Sheet 4

INVENTOR.
HERBERT J. OTTAWAY
BY
*Robert E. Breidenthal*
ATTORNEY ated Feb. 6, 1973

3,715,000
ENGINE POWERED JUMPING STICK
Herbert J. Ottaway, 3702 Elmwood Drive,
Wichita, Kans. 67218
Filed May 21, 1971, Ser. No. 145,822
Int. Cl. B62d 57/00
U.S. Cl. 180—8 R          4 Claims

ABSTRACT OF THE DISCLOSURE

A jumping stick of the type including a downwardly extensible ground-contacting plunger that is spring urged toward its extended position together with an improved two-stroke cycle internal combustion engine having its piston movable with the plunger and arranged on its power stroke to urge downward extension of the plunger.

The present invention relates to jumping sticks such as are commonly called pogo sticks, and the invention more particularly pertains to new and useful improvements in engine powered jumping sticks such as those of U.S. Pat. No. 2,929,459, entitled, "Combustible Gas Powered Pogo Stick," which issued Mar. 22, 1960, to Spitzmesser, and U.S. Pat. No. 2,510,509, entitled, "Mechanical Jumping Stick," which issued June 6, 1950 to Mays.

In its broadest aspect, the invention pertains to an internal combustion engine incorporating the improvement comprising a hollow cylinder having first and second ends respectively closed by first and second end walls, a piston slidingly and sealingly reciprocable in said cylinder between first and second positions respectively adjacent the first and second end walls, said piston dividing the interior of the cylinder into combustion and feed chambers respectively intermediate the piston and the first and the second end walls, said second end wall having a piston rod opening therethrough, an elongated piston rod of less diameter than the piston slidingly and sealingly extending through the piston rod opening and having one end secured to the piston and its other end projecting from the second end of the cylinder, spring means yieldingly urging axial movement of the piston in one direction, passageway means through the piston affording fluid communication between said chambers, check valve means for preventing fluid flow from the combustion chamber to the feed chamber through said passageway means, said cylinder including a cylindrical side wall, means including the side wall having a fuel-air inlet opening therethrough that is axially spaced intermediate the first and second end walls for introducing a fuel-air mixture into the feed chamber, said piston and said inlet opening being so constructed and arranged that the piston closes said inlet opening except when the piston is adjacent its first position, means including said side wall having an exhaust opening therethrough that is axially spaced intermediate the first end wall and the inlet opening for exhausting combustion products from the combustion chamber, said piston and said exhaust opening being so constructed and arranged that the piston closes said exhaust opening except when the piston is adjacent its second piston, and means for producing an electrical ignition spark within the combustion chamber in response to a predetermined movement of the piston adjacent the first position of the latter.

Another broad aspect of the invention is an internal combustion engine powered jumping stick comprising a vertically disposed hollow cylinder having upper and lower ends respectively closed by upper and lower end walls, a piston slidingly and sealingly reciprocable in said cylinder between upper and lower positions respectively adjacent the upper and lower end walls, said piston dividing the interior of the cylinder into combustion and feed chambers respectively intermediate the piston and the upper and lower end walls, said lower end wall having a piston rod opening therethrough, an elongated piston rod of less diameter than the piston slidingly and sealingly extending through the piston rod opening and having an upper end secured to the piston and a lower end projecting from the lower end of the cylinder, spring means yieldingly urging downward movement of the piston, said piston rod having means at its lowermost extremity adapted to contact a supporting surface, passageway means through the piston affording fluid communication between the chambers, check valve means for preventing fluid flow from the combustion chamber to the feed chamber through the passageway means, said cylinder including a cylindrical side wall, means including a fuel-air mixture inlet in the side wall axially spaced intermediate the upper and lower end walls for introducing a fuel-air mixture into the feed chamber, said piston and said inlet opening being so constructed and arranged that the piston closes said inlet opening throughout except when the piston is adjacent its upper position, means including said side wall having an exhaust opening therethrough that is axially spaced intermediate the upper end wall and the inlet opening for exhausting combustion products from the combustion chamber, said piston and said exhaust opening being so constructed and arranged that the piston closes the exhaust opening except when the piston is adjacent its lower position, means for producing an electrical ignition spark within the combustion chamber in response to a predetermined movement of the piston adjacent the upper position of the latter, an upstanding standard having a lower end secured to the upper end of the cylinder and an upper end portion adapted to be hand held, and footrest means mounted on the cylinder.

Numerous objects, features and advantages of the invention will become manifest on consideration of the following description of the preferred embodiment, such description being given in conjunction with the accompanying drawings, wherein:

FIG. 3 is an enlarged and two-part central vertical sectional view of the jumping stick, taken on the plane of the section line 3—3 in FIG. 2, with the plunger extended with portions of the structure being entirely or partially shown in elevation, and with certain hidden details being shown in dashed outline;

Figure 1:
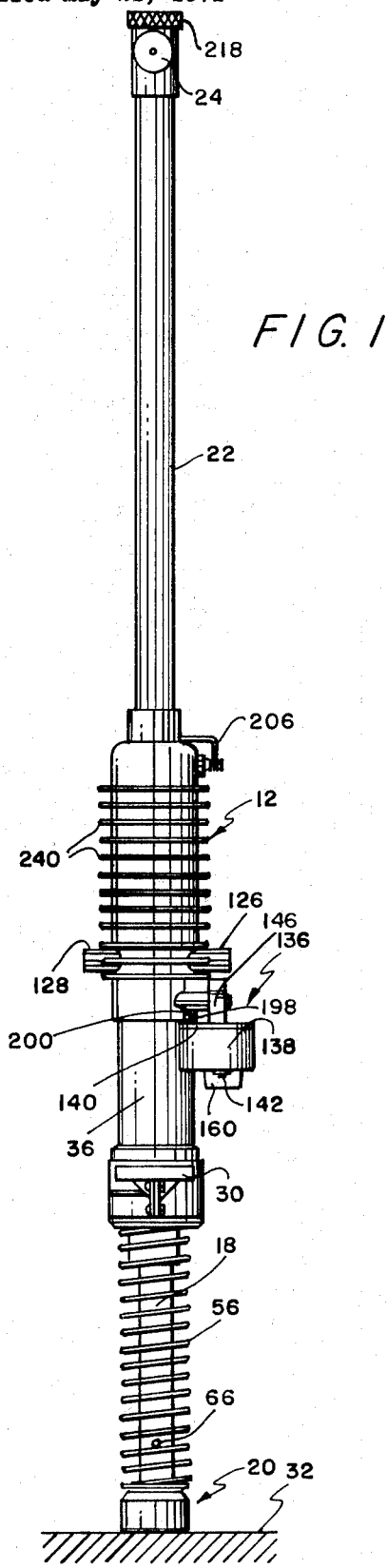
FIG. 1 is a side elevational view of the jumping stick with the plunger or piston disposed in its normal extended position.
Figure 2:
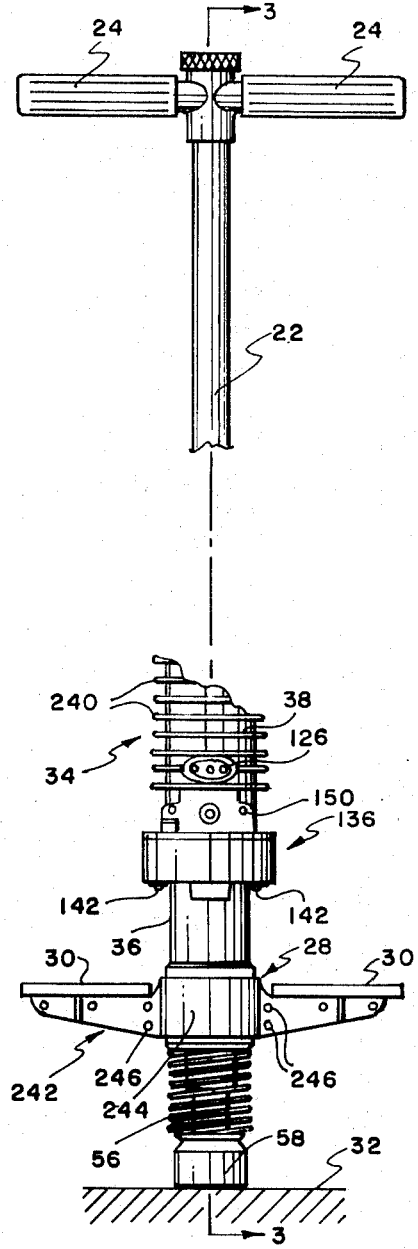
FIG. 2 is a broken rear elevational view of the jumping stick with the plunger in its retracted position.

Referring now to the drawings wherein like numerals designate like parts throughout the various views, the reference numeral 10 designates the jumping stick generally.

The jumping stick 10 comprises a single cylinder, two-stroke cycle internal combustion engine designated generally at 12 that is suitable for burning liquid fuel such as gasoline, alcohol, light petroleum distillates, etc., that incorporate a lubricating agent as may be needed such as motor oil, etc. The engine 12 is vertically arranged so that the piston 14 thereof reciprocates vertically with the piston 14 being connected to a depending piston rod 16 that projects downwardly from the engine 12 to constitute a vertically extensible and retractable plunger 18 that is provided with ground contacting means 20 at its lower free end.

Secured to and extending upwardly from the engine 12 is a standard or sticklike column 22 that is provided adjacent its upper end with a handle bar structure including oppositely extending horizontal handles 24.

Spring means 26 is provided for yieldingly urging downward extension of the plunger 18, and means designated generally at 28 and inclusive of oppositely extending horizontal footrests 30 are secured to the engine 12 adjacent the lower end of the latter.

Inasmuch as the plunger 18 is vertically reciprocable relative to the stick 22 by virtue of its connection to the vertically reciprocable piston 18, the similarity of the structure thus far described to a conventional jumping stick will be evident. As in the case of riding a conventional jumping stick, a rider, not shown, has his feet positioned on the footrests 30 and the handles 24 or the stick 22 itself in the grip of his hands. The rider and the stick 22 move alternately up and down with the ground engaging means 20 coming into contact with the ground surface 32 on downward movement of the stick 22 to compress and store energy in the spring means 26, with the energy so stored in the spring means 26 thereafter aiding upward movement of the stick 22.

Operation of the jumping stick 10 differs from that of the conventional jumping stick by reason of the provision of the two-stroke cycle engine 12 in that the power stroke of the latter aids the spring means 26 in causing the plunger 18 to move downwardly relative to the stick 22 and thereby force the stick 22 upwardly relative to the ground surface 32.

The engine 12 includes a cylinder 34 which is comprised of a vertical cylindrical steel sleeve 36 that is fixedly received within an elongated aluminum housing 38, the latter being heat shrunk upon and in heat exchange relationship with the steel sleeve 36.

The housing 38 extends above the sleeve 36 and includes a wall 40 that closes the upper end of the cylinder 34. The sleeve 36 extends below the housing 38 and is externally threaded at 41 at its lower end. The lower end of the cylinder 34 is closed by a cap structure 42 threaded on the sleeve 36 that includes an end wall 44. The end wall 44 is provided with a central opening 46 and has a depending integral boss 48 having a vertical cylindrical bore 50 constituting a downward continuation of the opening 46.

The cap structure 42 also is provided with an integral depending skirt 52 that defines jointly with the boss 48 an annular well 54 which receives the upper end of a coiled steel compression spring 56 that constitutes the spring means 26.

The ground engaging means 20 comprises a rubber or neoprene body 58 in which is embedded an upwardly projecting threaded stud 60. The means 20 also includes an annular metallic face plate 62 through which the stud 60 extends, and the latter is threaded into a threaded opening 64 in the lower end of the plunger 18 so that the face plate 62 bears against the lower end of the plunger 18. The face plate 62 is of greater diameter than the plunger 18, and the lower end of the spring 56 is seated against the face plate 62 as shown in FIG. 3. In order to facilitate the tight threading of the stud 60 into the opening 64, the plunger 18 is provided with an opening 66 therethrough, whereby a rod, not shown, can be inserted therethrough to hold the plunger 18 against turning as the body 58 is turned to accomplish the threading.

A metal collar 68 is slidably disposed upon the plunger 18, and an annular elastomeric cushion 70 of rubber or neoprene is disposed about the plunger 18 above the collar 68. The cushion 70 snugly embraces the plunger so as to hold the collar 68 normally against the face plate 62. It will be noted on inspection of FIG. 3 that the outside diameters of the collar 68 and of the cushion 70 are substantially less than the inside diameter of the spring 56 so as not to contact the latter. The cushion 70 will engage the lower end 72 of the skirt 48 to limit upward movement of the plunger 18 and of the piston 14 in a shock absorbing manner.

Sealing means is provided between the piston rod 16 and the skirt 48, such sealing means comprising rings 74 seated in annular grooves in the inner face of the skirt 48. The rings 74 can be of neoprene or any other suitable material such as a tetrafluoroethylene resin.

The piston 14 is comprised of upper and lower sections 78 and 80. The upper section 78 is a cylindrical aluminum body provided with piston rings 82 that make sliding and sealing engagement with the inner face of the sleeve 36. The upper end of the piston section 78 is of frusto-conical configuration as shown and is reduced and externally threaded at its lower end as indicated at 84. The lower section 80 comprises a cylindrical aluminum body that is provided with a cylindrical cavity or hollow 86 that opens at the upper end of the piston section 80. The upper end of the body section is internally threaded and is threadingly engaged with the threaded portion 84 of the upper piston section as shown.

The lower piston section 80 is provided adjacent its lower end with a piston ring 88 that makes sliding and sealing engagement with the sleeve 36.

Figure 4:
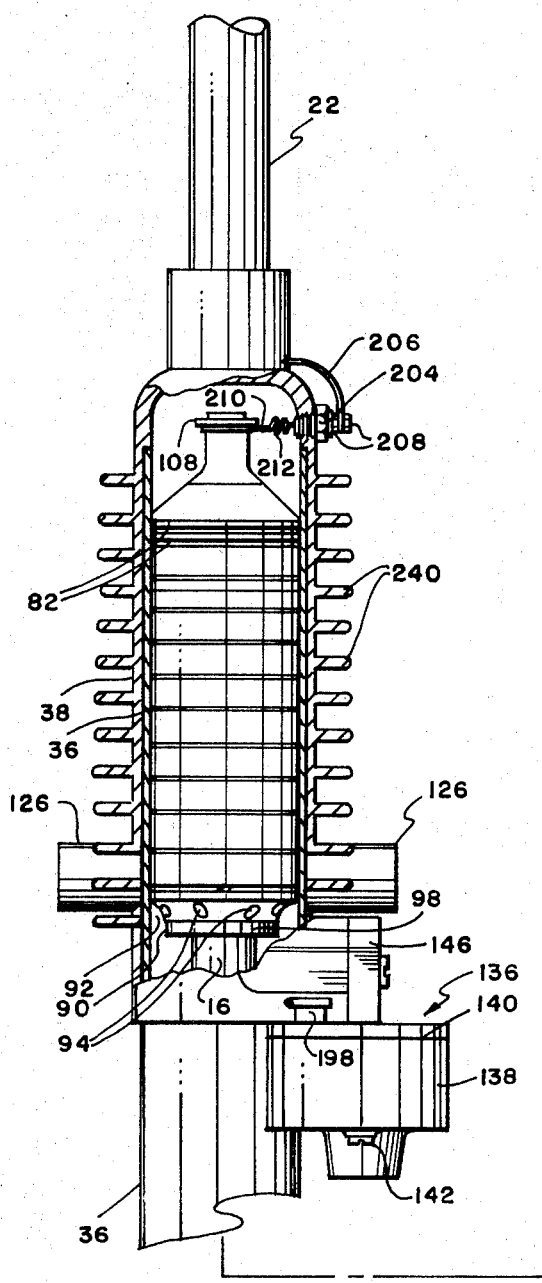
FIG. 4 is a fragmentary two-part elevational view of the jumping stick with the plunger retracted, and with the engine cylinder being partly broken away and shown in section to expose the piston to view.
Figure 5:
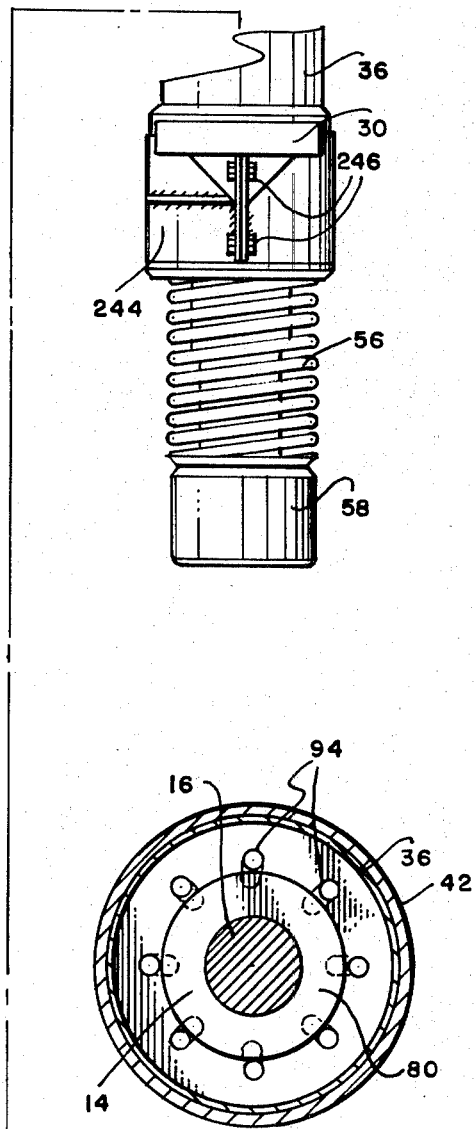
FIG. 5 is a transverse or horizontal sectional view taken upon the plane of the section line 5—5 in FIG. 3, with the hidden details being shown in dashed outline.

The lowest end portion of the piston section 80 is of reduced diameter as indicated at 90 to define an annular space 92 between the reduced portion 90 and the sleeve 36 as indicated in FIG. 4. A plurality of circumferentially spaced and downwardly divergent passageways 94 are provided in the piston section 80 that communicate between the annular space 92 and the hollow interior 86 of the piston. The piston section 80 is provided with a central opening 96 and the upper end of the piston rod 16 is tightly press fitted into the opening 96 in the piston section 80 for movement therewith.

An annular cushion 98, similar to the cushion 70, of resilient material such as neoprene snugly and frictionally embraces the piston rod 16 immediately below the piston section 80 and serves to limit and stop relative downward movement of the piston 14 and the plunger 18 on engagement of the cushion 98 with the end wall 44 in the same manner that the cushion 70 limits and stops relative upward movement of such parts in a cushioned fashion.

The piston section 78 has passageway means therethrough communicating between the hollow interior of the piston 86 and space 100 within the cylinder 34 above the piston 14, such passageway means comprising the section 78 having a central chamber 102 therein that opens through the upper end of the piston section 78. The piston section 78 is internally threaded at the upper end of the chamber 102 and an upstanding aluminum nozzle 104 has its lower end threaded thereinto as indicated at 106. The nozzle 104 has a vertical passageway 107 therethrough that is coaxial with the piston 14 that communicates between the chamber 102 and the space 100 that constitutes the combustion chamber of the engine 12. For a reason to be presently explained, the upper end of the nozzle has fixed thereto an annular metallic member, which can be of brass or steel that includes a radially outwardly extending and horizontal flange 108.

The configuration of the chamber 102 is such as to define an upwardly facing annular shoulder or valve seat 110 that cooperates a valve element 112 to close normally the chamber 102 against vertical fluid flow therethrough. The valve element 112 has a depending valve stem 114 that slidingly and guidingly extends through a central vertical opening in the bottom of the piston section 78 to a position wthin the piston hollow 86. A flanged nut 116 is threaded on the lower end of the valve stem 114 and a coiled compression spring 118 embraces the valve stem 114 and is seated between the flanged nut 116 and the bottom of the piston section 78 to yieldingly retain the valve element 112 seated on its seat 110 as shown in FIG. 3.

A plurality of vertical openings 120 are circumferentially spaced above the valve stem 114 and communicate between the piston hollow 86 and the interior of the chamber 102 at a position within the latter below the valve seat 110.

The sleeve 36 is provided with two sets of exhaust openings 122 and 124 that open outwardly respectively into generally elliptical exhaust port structures or exhaust stacks 126 and 128. The latter can if desired, though not shown, be provided with conventional exhaust muffling means in a manner well known in the art.

The exhaust openings 122 and 124 are disposed along the axial extent of the cylinder 34 such that they are totally uncovered by the upper end of the piston 14 solely when the latter is at the lowermost limit of its travel as shown in FIG. 3, and it will be understood that the vertical extent of the piston 14 and the limited extent of its movement preclude even partial uncovering of the openings 122 and 124 except when the piston 14 is relatively close to the position shown thereof in FIG. 3. In other words, the lower end of the piston 14 closes the openings 122 and 124 when the piston 14 is at the upper limit of its travel, that is when the cushion 70 engages the lower end of the skirt 48.

The sleeve 36 includes a set of intake openings 130 which open into an oblong and downwardly inclined passageway 132 that opens outwardly through a flat vertical exterior face 134 of the housing 38.

The openings 130 are disposed at a lower height than the exhaust openings 122 and 124, such that they are fully uncovered by the lower end of the piston 14 solely when the piston 14 is at or closely approaches the upper limit of its travel, and such openings 130 are, of course, closed when the piston 14 is at the position shown thereof in FIG. 3.

Figure 6:
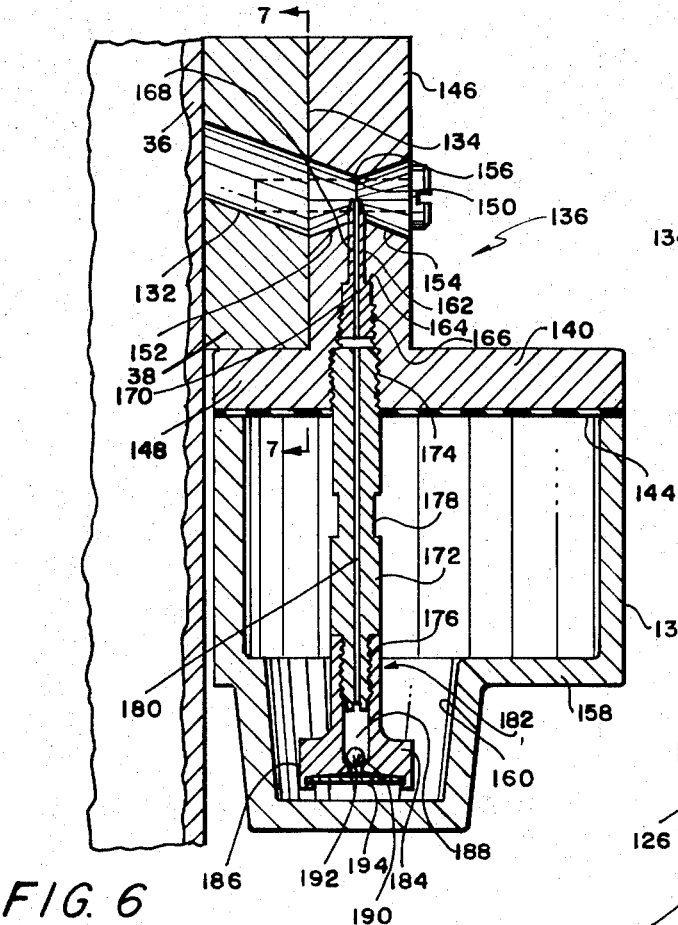
FIG. 6 is an enlarged vertical sectional detail view of the fuel supply and carburetion system, the view being taken upon the plane of the section line 3—3 in FIG. 2.
Figure 7:
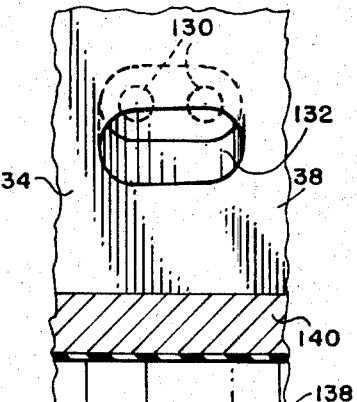
FIG. 7 is a vertical sectional detail view taken upon the plane of the section line 7—7 in FIG. 6, with hidden details being shown in dashed outline.
Figure 9:
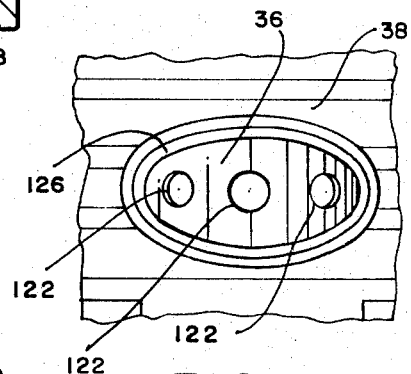
Figure 8:
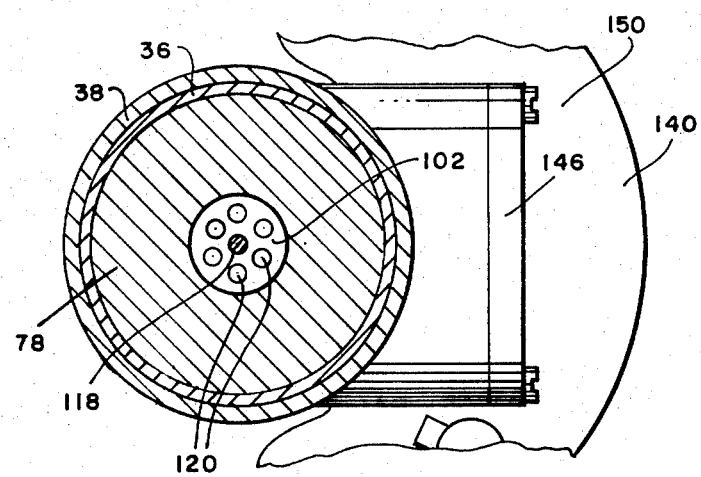
FIG. 8 is an enlarged fragmentary horizontal sectional view taken upon the plane of the section line 8—8 in FIG. 3; and, FIG. 9 is an enlarged elevational detail view taken from the vertical plane indicated by the line 9—9 in FIG. 3.

A fuel supply and carbureting system designated generally at 136 is provided, the same being best shown in FIG. 6. The system comprises a fuel tank 138 that is provided with a cover 140 to which it is detachably attached by means including upstanding threaded fasteners 142 that threadingly engage the cover 140 (not shown) as will be understood by those skilled in the art. A sealing gasket 144 is interposed between the tank 138 and the cover 140.

The tank 138 and its cover 140 (both of which can be aluminum) are disposed adjacent the sleeve 36 immediately below the housing 38, and they are somewhat kidney shaped so that the sides of such elements adjacent the sleeve 36 are contoured to be generally conformable to the external cylindrical shape of the latter.

The cover 140 includes an upstanding integral plate or rib section 146 that is seated against the flat face 134 of the housing 38 with the cover 140 having a portion 148 that underlies and abuts the bottom of the housing 38 as clearly shown in FIG. 6. The rib section 146 is detachably secured to the housing 38 by means of a pair of threaded fasteners 150.

The rib section 146 has an opening therethrough that includes tapered portions 152 and 154 that define a venturi throat 156 of circular cross section at the juncture of the portions 152 and 154. The major end of the opening portion 152 communicates with the passageway 132 through the housing 38, and the major end of the opening portion 154 has free communication with ambient atmosphere.

Means is provided for aspirating a liquid fuel (a mixture of gasoline and lubricating oil such as conventionally employed for two-stroke cycle internal combustion engines is suitable, though other suitable liquid fuels may be used such as alcohol, diesel oil, and mixtures thereof together with miscible or finely dispersed lubricating agents necessary to obtain adequate engine lubrication) within the tank 138 into the center of the venturi throat 156 under the influence of the reduction of pressure reduction occurring in the throat 156 when ambient air is drawn into the engine 12 through the throat 156. Such means comprises the bottom wall 158 being formed to define a well or sump 160 that is centered directly below the venturi throat 156. The rib section 146 and cover 140 have a vertical opening communicating between the bottom of the throat 156 and the interior of the tank 138. The opening 162 is internally shouldered at 164 and a kerfed fitting 166 of brass is threaded into the opening 162 as shown and is sealingly seated against the shoulder 164. The fitting 166 includes an integral upstanding portion 168 of relatively reduced transverse dimension that projects upwardly into the venturi throat 156 and terminates at its upper end at the center of the latter. The fitting portion 168 is of substantially less diameter than the throat 156 as shown. The fitting 166 including its portion 168 has a vertical passageway 170 therethrough so that the portion 168 constitutes a fuel feed tube projecting into and having its uppermost discharge end centered in the venturi throat.

A second fitting 172 of brass has its upper end sealingly threaded into the lower end of the opening 162 as shown at 174, and the fitting 172 extends from the cover 140 downward vertically into the interior of the tank 138. The lower end of the fitting 172 is reduced and externally threaded at 176. The fitting 172 is provided with flat external surfaces 178 intermediate its vertical extent to facilitate the use of a tool, not shown, for threading the fitting 172 into the opening 162 at 174. The fitting is provided with a central passageway 180 therethrough that communicates with the passageway 170.

A combined check valve and fuel filter means designated generally at 182 is disposed within the sump 160 and supported by the fitting 172. The means 182 comprises a generally bell-shaped brass body 184 having an enlarged lower end portion 186 disposed in and spaced above the bottom of the sump 160. The body 184 has a central vertical opening 188 therethrough into the upper end of which the threaded portion 176 of the fitting 172 is sealingly threaded as shown. An intermediate portion of the vertical extent of the opening 188 is reduced to define an upwardly facing annular ball valve seat 190, and a ball valve element 192 is disposed in the opening 188 and normally rests on the seat 190. The lowermost extent of the opening 188 is substantially enlarged as shown and a filter screen or disc 194 of brass is secured to the body 186 adjacent the lower end of the opening 188.

The arrangement is such that when the pressure within the venturi throat 156 is sufficiently lower than the pressure within the tank 138, fuel mixture is forced upwardly through the screen 194, the ball valve element 192 is unseated, and fuel passes upwardly through the body 184 and the fittings 172 and 166 to be discharged into the center of the venturi throat 156. When the pressure differential falls to such a value that such flow does not occur, the ball 192 seats on its seat 190 to prevent reverse flow so that the fitting 166 including its portion 168 remains substantially filled with fuel, whereby recurrence of adequate pressure differential results in immediate discharge of fuel into the venturi throat 156.

Means is provided for introducing a fuel mixture into the tank 138 that is of such character as to assure pressure within the upper portion of the tank 138 remaining at atmospheric pressure despite the withdrawal of fuel therefrom occasioned by discharge of fuel into the venturi throat 156. Such means comprises the cover 140 being provided with a filling opening, not shown, that is provided with a cover cap structure 198 that includes a cover that is spring biased to close 200 that is biased to its closing position. The cover cap structure 198 is conventional and is of the type having wide use as a lubrication fitting for electric motors, fans and the like. The cover cap structure 198 prevents the fuel from splashing from the tank 138, and yet falls short of being perfectly airtight so as to serve as an air bleeder.

The motor 12 is provided with an ignition system that is best shown in FIGS. 3 and 4, such system including a metallic fitting 204 threaded through the housing 38 adjacent the upper end of the cylinder 34. The metallic fitting 204 is somewhat similar to a conventional spark plug in that the same is hollow and is filled with electrical insulating material, not shown, which can be a ceramic substance or a suitable synthetic resin such as epoxy, through which an electric conductor extends with the outer end being formed as a threaded stud for connection of an ignition wire 206 thereto as by nuts 208 threaded on such stud. The present structure departs from that of a conventional spark plug in that the inner end of the insulated electrical conductor extending through the fitting 204 is formed of a wire 210 of stainless steel of resilient character that projects into the interior of the cylinder 34. The wire 210 has an intermediate portion of its extent formed as a series of convolutions shown at 212 and terminates in a straight free end portion 214 that is directed radially inwardly toward the axis of the cylinder 34. The convolutions 212 contribute substantially to the resilient flexibility of the wire 210, especially as to vertical movement of the free end extremity of the wire portion 214.

The free end of the wire portion 214 is spaced slightly closer to the axis of the cylinder 34 than is the periphery of the previously described flange 108 carried by the piston 14. The arrangement is such that the wire 210 is contacted by and only by the flange 108 during vertical reciprocation of the piston 14 that occurs during engine operation. The flange 108 will contact the wire 210 as the piston 14 approaches the upper extent of its movement and preferably will contact and pass by the wire so as to break contact therewith prior to the piston 14 reaching its upper limiting position. In any event, the flange will contact the wire 210 at least once and break contact with the wire at least once during each cycle of reciprocation of the piston 14 when the piston moves adjacent the upper limit of its travel. As will be seen presently, an ignition arc or spark occurs between the wire 210 and the flange on the breaking of direct electrical contact or engagement of such elements. Fuel mixture ignition is, of course, at least doubly assured when two or more arcs are sequentially generated in the combustion chamber 100 each time the piston 14 is adjacent the upper limit of its travel.

The column or stick 22, which can be of steel or aluminum, is tubular as shown and the lower end thereof is fixed to the upper end of the housing 38 as by being press fitted in a socket 216 defined at the upper end of the housing 38. The upper end of the column 22 is externally threaded and a metallic cap 218 is threaded thereon as shown at 220. An inductor 222 is positioned with the lower end portion of the column as shown. The inductor 222 includes an iron core, not shown, about which there are many turns 224 of an insulated wire having one end portion extending through a suitable opening 226 in the housing 38 and constituting the previously mentioned ignition wire 206 electrically connected to the flexible electrode or wire 210. The other end of the insulated wire that forms the turns 224 is electrically connected to an upwardly facing contactor 228 that is electrically insulated from the rest of the structure of the inductor 222 as well as from the column 22. While the inductance of the inductor is high, such inductance is increased or the number of turns 224 thereof can be decreased when the column 22 is of steel so as to reduce the reluctance of magnetic flux paths associated with the inductor 222.

A series of dry cell batteries 230 are disposed in electrical series in the column with the positive terminal 232 of the lowermost battery being in electrical engagement with the inductor contactor 228, and the negative case 234 of the uppermost battery 230 is electrically connected to the cap 218 by a coiled compression spring 236 that is preferably secured to the cap 218 in a manner common to conventional flashlights.

The metallic and electrically conductive character of the parts involved together with the mechanical engagements involved, whether fixed or relatively movable, are such that a low or essentially zero electrical resistance path is afforded between the cap 218 and the flange 108 carried by the piston 14. Accordingly, whenever the flange 108 engages the wire 210, a series electric circuit is provided from the positive terminal 232 of the batteries 230 through the inductor 222, the contacting flange 108 and wire 210, the piston 14, the cylinder 34, housing 38, column 22, cap 218 and spring 236 to the negative case 234 of the batteries 230. Such electric circuit, broken when the flange or electrode 108 disengages the flexible electrode 210, is highly inductive and hence productive of an electric arc or spark between such electrodes when they become disengaged.

The arrangement of and dimensions of the flange 108 and the wire 210 are preferably such that in relation to the inductance of the inductor 222 that they contact for a time interval only slightly in excess of that necessary to store sufficient magnetic energy in association with the circuit to provide an adequately energetic arc or spark to effect the desired fuel ignition.

The exterior of the housing 38 is provided with a vertical series of integral ribs or fins 240 constituting cooling fins for the air cooling of the motor 12.

The previously mentioned footrests 30 are carried by a split yoke structure 242 that centrally embraces and is frictionally clamped to the cylindrical element 52 at 244 by suitable fasteners 246.

The operation of the jumping stick 10 will be readily understood. Assuming that the piston 14 is moving downwardly on a power stroke, a fuel-air mixture in the cylinder 34 below the piston 14 and in the hollow 86 of the piston undergoes compression with an increase in the pressure thereof. Combustion products and burning fuel-air mixture in the combustion chamber 100 is urging downward movement of the piston 14, but such materials are denied entry into the hollow 86 of the piston by their superior pressure and the spring 118 maintaining the valve 112 in its passageway closing position. As the piston 14 approaches its lowermost limit of its downward movement, virtually all, if not all, fuel in the combustion chamber 100 has burned and the latter is discharged to the ambient atmosphere as the upper end of the piston 14 clears or opens the sets of exhaust openings 122 and 124, whereupon the pressure within the combustion chamber 100 falls below the pressure then prevailing within the hollow 86 of the piston 14, with the consequent opening of the valve 112 and flow of fuel-air mixture from the hollow 86 of the piston 14 into the combustion chamber 100, which flow occurs for only a brief portion of the time that the openings 122 and 124 remain open because of the piston 14 being driven upward very shortly after having reached its lowermost position by reason of the weight of the user causing forcible engagement of the ground engaging member 58 with the ground shortly after the piston 14 reaches the end of its downward movement.

The flow of fuel-air mixture from the hollow 86 to the combustion chamber 100 continues through a portion of the upward movement of the piston 14; specifically, such flow continues until the pressure differential favoring the hollow 86 over that in the chamber 100 falls below an amount sufficient to keep the valve 112 from its seat 110.

It will be noted that upward movement of the piston 14 results in lowering of such pressure differential and that continued relative upward movement of the piston 14 compresses the fuel-air mixture in the chamber 100 to progressively increase its pressure while the pressure of the fuel-air mixture within the piston hollow 86 and in the space within the cylinder 34 below the piston 14 progressively diminishes by reason of expansion of the volume occupied thereby to a subatmospheric pressure. The piston 14 continues its relative upward movement by reason of the user causing continued downward movement of the cylinder 34 relative to the ground.

Shortly prior to the piston 14 having moved upwardly enough for the flange 108 to contact the wire 210, the lower end of the piston commences to open the intake openings 130, whereupon the piston hollow 86 and the space in the cylinder 34 below the piston 14 is spaced in communication with the ambient atmosphere so that a high velocity air flow into the space below the piston 14 from the ambient atmosphere occurs by reason of the subatmospheric pressure prevailing in such space. Such high velocity air flow passes through the venturi throat 156 so that a substantially subatmospheric pressure is caused to exist at such location sufficient to cause aspiration of fuel into the venturi throat 156 as previously explained. Fuel aspirated into the throat 156 is picked up by and forms a fuel-air mixture carried into the space in the cylinder 34 below the piston 14. Such flow of fuel-air mixture or carbureting process continues until the piston 14 subsequently moves down to close the openings 130.

Such subsequent downward movement of the piston 14 will be caused forcibly to occur by reason of the flange 108 making and breaking contact with the flexible electrode 210 one or more times as the piston 14 moves up to its limiting position. The resilient character of the flexible electrode 210 is such that the same may oscillate vertically to make a series of make and break contacts with the flange electrode 108 to produce a series of arcs or sparks. The arcs or sparks produced ignite the fuel-air mixture in the chamber 100 that results in such a pressure increase as to force downward relative movement of the piston 14 and the plunger 18 causing the page stick to jump and to return the engine 12 to the starting point for commencing again another cycle such as described above.

It should be noted that the engine 12 will cease to operate and the parts thereof will assume the positions shown in FIG. 3 whereupon the user dismounts from the jumping stick 10 so that the piston 14 is not forced into relative upward movement. With the parts in the position shown thereof in FIG. 3, the electric circuit is open and remains open, and consequently there is no reason to provide any off and on switch in association with such circuit to prevent battery drain when the apparatus is not in use.

It is a simple matter to initiate engine operation. The user, with one foot on the ground, uses his other foot to urge one of the footrests 30 downwardly one or more times until the engine 12 fires, whereupon the rider places both feet on the rests 30 and proceeds with his ride. The spring 56 is relatively weak as compared to the corresponding spring of a conventional jumping or pogo stick so that the initiation of engine operation as described is easily effected. The reason that the spring 56 is or can be relatively weak is that it is assisted by the engine 12 in urging the user upwardly. Also the compression of gaseous materials in the cylinder above the piston contributes to the resilience or bounce effect produced by the spring.

The jumping stick 10 is fun to use as well as being interesting from the standpoint of spectators. It requires and aids users in developing the physical coordination necessary to maintain balance, especially for sustained rides. It allows users the fun of competition, either against a timing device or count of jumps, or against concurrent users of other sticks in races or about an obstacle course. The sound or loudness of the exhaust can be such as to seemingly contribute to the enjoyment of the user, presumably by commanding or attracting attention, and yet be such as not to constitute an objectionable nuisance to others. An incidental benefit of the jumping stick 10 is that it is conducive to users having an easily satisfied desire to become familiar with the principles of internal combustion engine operation of the two-stroke cycle type.

Attention is now directed to the appended claims whereby the scope of the invention may be ascertained.

I claim:

1. An internal combustion engine powered jumping stick comprising a vertically disposed hollow cylinder having upper and lower ends respectively closed by upper and lower end walls, a piston slidingly and sealingly reciprocable in said cylinder between upper and lower positions respectively adjacent the upper and lower end walls, said piston dividing the interior of the cylinder into combustion and feed chambers respectively intermediate the piston and the upper and lower end walls, said lower end wall having a piston rod opening therethrough, an elongated piston rod of less diameter than the piston slidingly and sealingly extending through the piston rod opening and having an upper end secured to the piston and a lower end projecting from the lower end of the cylinder, spring means yieldingly urging downward movement of the piston, said piston rod having means at its lowermost extremity adapted to contact a supporting surface, passageway means through the piston affording fluid communication between the chambers, check valve means for preventing fluid flow from the combustion chamber to the feed chamber through the passageway means, said cylinder including a cylindrical side wall, means including a fuel-air mixture inlet in the side wall axially spaced intermediate the upper and lower end walls for introducing a fuel-air mixture into the feed chamber, said piston and said inlet opening being so constructed and arranged that the piston closes said inlet opening throughout except when the piston is adjacent its upper position, means including said side wall having an exhaust opening therethrough that is axially spaced intermediate the upper end wall and the inlet opening for exhausting combustion products from the combustion chamber, said piston and said exhaust opening being so constructed and arranged that the piston closes the exhaust opening except when the piston is adjacent its lower position, means for producing an electrical ignition spark within the combustion chamber in response to a predetermined movement of the piston adjacent the upper position of the latter, an upstanding standard having a lower end secured to the upper end of the cylinder and an upper end portion adapted to be hand held, and footrest means mounted on the cylinder.

2. The combination of claim 1, wherein the means for introducing a fuel-air mixture into the annular chamber comprises a member mounted on the exterior of the cylinder defining a feed passageway therethrough communicating between ambient atmosphere and the inlet opening, said passageway having a constriction constituting a venturi throat, a liquid fuel supply tank below said venturi throat, and conduit means affording fluid communication between the bottom of the tank and the feed passageway at the venturi, whereby liquid fuel from the tank is aspirated into an air stream moving through the feed passageway.

3. The combination of claim 1, wherein the spark producing means includes a normally open inductive electric circuit connected to an electric battery, and means carried by and movable with the piston within the cylinder to close and open said inductive circuit at a position within the combustion chamber upon the occurrence of said predetermined movement of the piston adjacent its upper position.

4. The combination of claim 3, wherein the standard is tubular, said circuit including an electric inductor disposed within said tubular standard, and said electric battery also being disposed in said tubular standard.

References Cited

UNITED STATES PATENTS

| | | | |
|---|---|---|---|
| 2,371,368 | 3/1945 | Wallace | 180—8 R |
| 2,510,509 | 6/1950 | Mays | 180—8 R |
| 2,929,459 | 3/1960 | Spitzmesser | 180—8 R |
| 3,495,671 | 2/1970 | Samiran | 180—8 R |

LEO FRIAGLIA, Primary Examiner

U.S. Cl. X.R.

123—65